(12) United States Patent
Killadi et al.

(10) Patent No.: US 10,165,480 B1
(45) Date of Patent: Dec. 25, 2018

(54) SELECTIVELY DEAUTHENTICATING A CLIENT DEVICE MANAGED BY A CONTROLLER ASSOCIATED WITH MULTI-ZONES

(71) Applicant: Aruba Networks, Inc., Santa Clara, CA (US)

(72) Inventors: Srinivas Rao Killadi, Bangalore Karnataka (IN); Sree Vasthav Shatdarshanam Venkata, Bangalore Karnataka (IN); Chanakya Kondayya Chowdary Challagolla, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 7 days.

(21) Appl. No.: 15/631,782

(22) Filed: Jun. 23, 2017

(51) Int. Cl.
    *H04W 36/00* (2009.01)
    *H04W 12/06* (2009.01)

(52) U.S. Cl.
    CPC ....... *H04W 36/0055* (2013.01); *H04W 12/06* (2013.01); *H04W 36/0011* (2013.01)

(58) Field of Classification Search
    CPC ................................................ H04W 36/0055
    USPC .................................. 455/436–444; 370/331
    See application file for complete search history.

(56) References Cited

U.S. PATENT DOCUMENTS

| | | | |
|---|---|---|---|
| 8,300,611 B2 | 10/2012 | Nandagopalan | |
| 8,385,197 B2 | 2/2013 | Krym et al. | |
| 8,411,608 B2 | 4/2013 | Moscebroda et al. | |
| 8,483,194 B1 | 7/2013 | Wu et al. | |
| 8,787,375 B2 | 7/2014 | Liu et al. | |
| 9,161,293 B2 | 10/2015 | Choudhary et al. | |
| 9,338,793 B2 | 5/2016 | Guo et al. | |
| 9,426,810 B2 | 8/2016 | Shapira et al. | |
| 2002/0022483 A1* | 2/2002 | Thompson | H04L 12/1464 455/439 |
| 2006/0262763 A1* | 11/2006 | Peleg | H04W 28/08 370/338 |

(Continued)

OTHER PUBLICATIONS

Molina, E. el al., "Availability improvement of Layer 2 Seamless Networks Using Openflow", Jan. 8, 2015, The Scientific World Journal, vol. 2015, Article ID 283165, 14 pgs.*

(Continued)

*Primary Examiner* — Charles Shedrick
(74) *Attorney, Agent, or Firm* — Hewlett Packard Enterprise Patent Department (57) ABSTRACT

Example method includes: establishing, by an access point, a first connection to a first controller associated with a first zone; establishing, by the access point, a second connection to a second and different controller associated with a second and different zone; determining, by the access point, that the first zone is preferred over the second zone; receiving, by the access point, an association request from a new client device managed by the first controller; in response to a number of client devices managed by the second controller and associated with the access point exceeding a predefined number, selectively de-authenticating at least one client device managed by the second controller associated with multi-zones; and transmitting, by the access point, an association response to the new client device managed by the first controller to allow the new client device connect to the access point.

20 Claims, 5 Drawing Sheets

(56) References Cited

U.S. PATENT DOCUMENTS

| | | | | |
|---|---|---|---|---|
| 2007/0127423 | A1* | 6/2007 | Ho | H04W 8/18 |
| | | | | 370/338 |
| 2010/0290397 | A1* | 11/2010 | Narayana | H04L 47/125 |
| | | | | 370/328 |
| 2015/0036493 | A1* | 2/2015 | Cj | H04L 12/4641 |
| | | | | 370/235 |

OTHER PUBLICATIONS

WLAN Airtime Scheduling Technology White Paper, Huawei Technologies Co., Ltd., Issue 10, Apr. 22, 2014, 15 pages.

* cited by examiner

SELECTIVELY DEAUTHENTICATING A CLIENT DEVICE MANAGED BY A CONTROLLER ASSOCIATED WITH MULTI-ZONES

BACKGROUND

The multi-zone feature of a wireless controller can allow multiple controllers to manage their wireless services separately with the same wireless access point infrastructure, while relieving the radio frequency interference that would come from having multiple wireless networks. Air time fairness may be based on the radio characteristics, but not multi-zones.

BRIEF DESCRIPTION OF THE DRAWINGS

The following detailed description references the drawings, wherein.

DETAILED DESCRIPTION

The multi-zone feature of a wireless controller can allow multiple controllers to manage their wireless services separately with the same wireless access point infrastructure, while relieving the radio frequency interference that would have resulted from having multiple wireless networks. This structure allows for management and data traffic to be separated between multiple zones. Traffic can be tunneled from a client device to two completely separate controllers through the same access point, ensuring network security while reducing infrastructure costs. However, currently, air time fairness is based on the radio characteristics. Thus, air time fairness based on zones may not be implemented in a multi-zone environment.

The disclosed solution according to examples herein can provide air time fairness in a multi-zone environment by either (1) providing more airtime fairness to the preferred zone clients and (2) configure a predefined percentage of client allocation for each zone statically; or (3) selectively de-authenticate the clients that are connected to one of the non-preferred zones when a new client from a preferred zone tries to connect to the access point. The terms "MultiZone," "multizone," and "multi-zone" are used interchangeably herein.

As used herein, "air time fairness" generally may refer to providing every client device with an equal opportunity to utilize the network bandwidth irrespective of factors, such as, client type, capability, operating system, etc. For example, an air time fairness configuration may include several modes, including but not limited to, a default-access mode (e.g., client devices are serviced based on the requests they make); a fair-access mode (e.g., each client device gets the same amount of air time regardless of client capability and capacity); a preferred-access mode (e.g., high-throughput (IEEE 802.11 ac/n compliant) client devices do not get penalized because of slower (IEEEE 802.11g/b compliant) client transmissions that may take more air time due to lower transmit rates); etc. The fair-access mode is useful in environments, such as, a training facility or an exam hall where a mix of client devices compliant with IEEE 802.11a/g, 802.11g, 802.11n, and 802.11ac need equal access to network resources regardless of their capabilities. In the preferred-access mode, the IEEE 802.11a compliant client devices get more airtime than 802.11g clients which in turn get more airtime than 802.11b (e.g., at a ratio of 16:4:1 for 11a:11g:11b).

Examples described herein include a method for establishing a first connection to a first controller associated with a first zone; establishing a second connection to a second and different controller associated with a second and different zone; determining that the first zone is preferred over the second zone; receiving an association request from a new client device managed by the first controller; selectively de-authenticating at least one client device managed by the second controller associated with multi-zones in response to a number of client devices managed by the second controller and associated with the access point exceeding a predefined number; and, transmitting an association response to the new client device managed by the first controller to allow the new client device connect to the access point.

Moreover, the above method may also include transmitting a first wireless beacon including a first extended service set identification (ESSID) subsequent to establishing the first connection to the first controller; transmitting a second wireless beacon including a second and different ESSID subsequent to establishing the second connection to the second controller, wherein the first wireless beacon and the second wireless beacon are transmitted on a same wireless channel medium; receiving a predefined amount of air time allocated for client devices connected to the second ESSID; and refraining from transmitting data from the access point to the client devices connected to the second ESSID in response to air time consumed by the client devices connected to the second ESSID exceeding the predefined amount of air time. Therefore, client devices managed by the first controller may have more air time than client devices managed by the second controller in a pre-configurable ratio. Also, traffic transmitted from an access point to client devices managed by the first controller may have a higher priority than traffic transmitted from the access point to client devices managed by the second controller.

Figure 1:
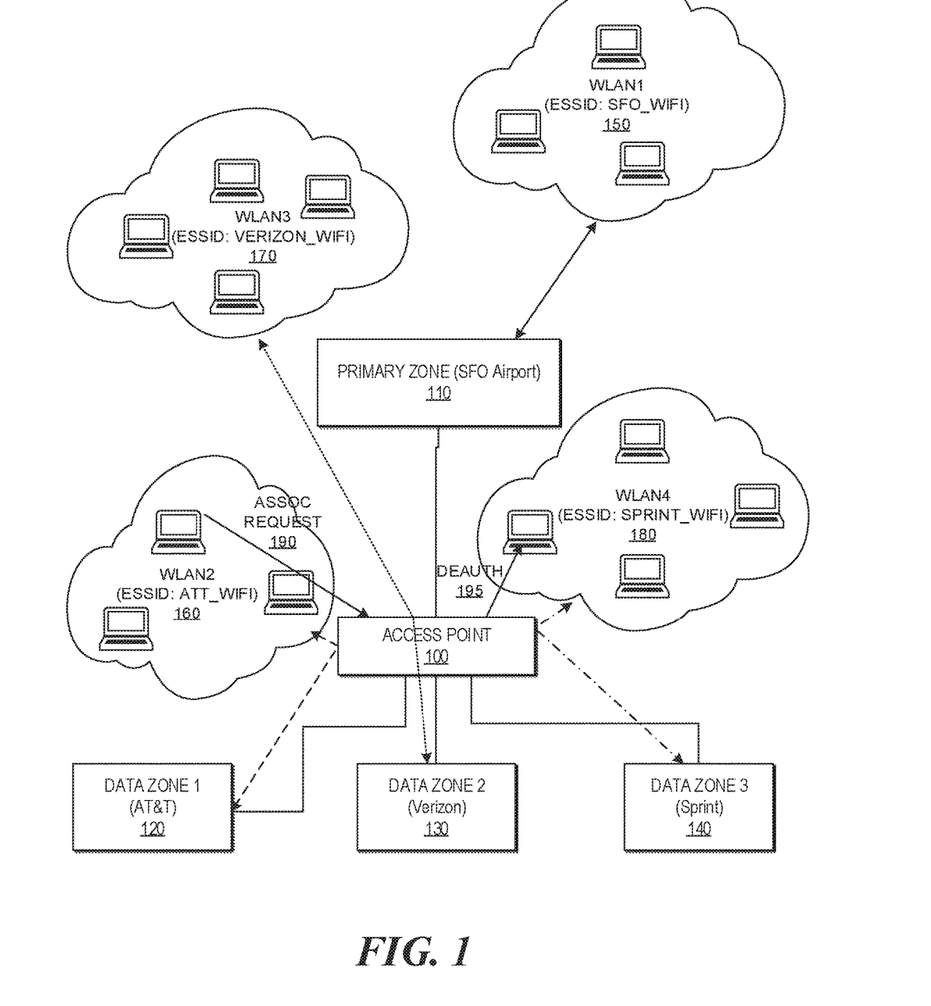
FIG. 1 is a block diagram of an example system environment for selectively de-authenticating a client device managed by a controller associated with multi-zones.

FIG. 1 is a block diagram of an example system environment for selectively de-authenticating a client device managed by a controller associated with multi-zones. FIG. 1 includes an example access point 100 deployed in a multi-zone environment. Specifically, in this example, the multi-zone environment includes a primary zone 110 (e.g., a wireless network at SFO airport) and a plurality of data zones 120-140. Each data zone may be leased and used by a different service provider to service its customers.

In this example, assuming that Data Zone 1 120 is used by AT&T to provide hotspot wireless network service for AT&T customers; Data Zone 2 130 is used by Verizon to provide hotspot wireless network service for Verizon customers; Data Zone 3 140 is used by Sprint to provide hotspot wireless network service for Sprint customers; etc. As such, access point 100 may transmit wireless beacons including an ESSID of ATT_WIFI to client devices located within its coverage area. When an AT&T customer chooses to connect his/her client device with ATT_WIFI, the client device can be connected to WLAN2 160. Likewise, access point 100 may transmit wireless beacons including an ESSID of Verizon_WIFI to client devices located within its coverage area. When a Verizon customer chooses to connect his/her client device with Verizon_WIFI, the client device can be connected to WLAN3 170. Also, access point 100 may transmit wireless beacons including an ESSID of Sprint_WIFI to client devices located within its coverage area. When a Sprint customer chooses to connect his/her client device with Sprint_WIFI, the client device can be connected to WLAN4 180. Other client devices may choose to connect to the public wireless network at SFO by connecting to WLAN1 150, which has an ESSID of SFO_WIFI.

Moreover, each data zone may have its own network controllers, controller clusters, and/or virtual controllers that are used to manage the client devices associated with a particular data zone. Access point 100 may be connected to at least one controller from primary zone 110 and each of the three data zones 120-140. Furthermore, traffic from WLAN2 160 can be transmitted to the controller(s) in Data Zone1 120 via a secure tunnel through access point 100; traffic from WLAN3 170 can be transmitted to the controller(s) in Data Zone2 130 via a second secure tunnel through access point 100; traffic from WLAN4 180 can be transmitted to the controller(s) in Data Zone3 140 via a third secure tunnel through access point 100; and vice versa.

More specifically, a controller from primary zone 110 acts as the primary controller to manage access point 110. As a result, access point 100 may download a multi-zone configuration profile from the controller from primary zone 110. The multi-zone configuration profile may include the Internet Protocol (IP) addresses of the controllers in the multiple data zones 120-140. In addition, access point 100 may download multiple virtual access point (VAP) profiles from the controllers in each of the data zones 120-140, and may install and configure multiple VAPs. Also, access point 100 may receive an extended service set identifier (ESSID) from the controller(s) in each data zone 120-140, and may broadcast beacons including the received ESSIDs. Therefore, multiple controllers from different zones can host different ESSIDs on the same access point.

When no restriction is imposed on the number of client devices allowed to connect to each ESSID in a multi-zone environment, there is a risk of exhausting the client connection limit if one data zone has a large number of connected client devices. This can cause client devices from other data zones to suffer from lack of access to the network.

According to examples of the present disclosure, the multiple data zones in the multi-zone environment can be assigned with different priorities. For example, as illustrated in FIG. 1, when multiple carriers offering network services at the SFO airport with different ESSIDs, the SFO can charge a differentiated amount of premium for these services to the carriers, which would allow a WLAN associated with a first data zone to be prioritized over another WLAN associated with a second data zone. For example, assuming that AT&T pays for a higher premium than Verizon and Sprint. Therefore, a client device of an AT&T customer that is connected to WLAN1 160 can enjoy a higher priority than other client devices of other carriers (e.g., Verizon or Sprint) at SFO airport.

In some examples, in response to a carrier pays a premium, the system can create a user-defined number or percentage of client devices that are allowed to connect to each data zone. For example, maximum of 100 AT&T customer client devices in WLAN2 160 may be allowed to connect to access point 100, whereas a maximum of 50 Verizon or Sprint customer client devices from WLAN3 170 and WLAN4 180 can connect to access point 100. As another example, the system may be configured to allow a maximum of 50% of client devices to be connected from WLAN2 160, and a maximum of 25% of client devices to be connected from WLAN3 170 and WLAN4 180.

In some examples, instead of pre-define a static number or percentage of client devices allowed to connect from each zone, the system can optimize the determination of the allowance allocations to each data zone based on machine learning of real-time network conditions and traffic patterns.

The above example implementations can fix a certain value per data zone. Therefore, the data zones may not exhaust the maximum number of client devices allowed per access point. Nevertheless, as in any static allocation, if a particular data zone does not have any client devices, then the ability of the access point to service more client devices is defeated because client devices from other data zones may not utilize the extra bandwidth reserved for the particular data zone.

In some examples, the system may not impose a limit on the maximum number of client devices that customers from each carrier may connect. However, if a threshold number of client devices are connected to access point 100, the system may dynamically de-authenticate a number or percentage of the client devices of the customers from low priority data zones (e.g., client devices from WLAN3 170 and WLAN4 180) when a new client device from a high priority data zone (e.g., client devices from WLAN1 160) tries to connect to access point 100 after the threshold number or percentage has been reached.

The above example implementation provides a more dynamic and flexible way of handling the resource allocation. When a particular data zone has an open ESSID, this attracts more client devices that may exceed the threshold of maximum allowed client devices. These client devices may be in an idle state and not using the network resources. If a new client device attempts to connect to the access point from a different data zone, the new client device may not have the access because the access point's limit of maximum allowed client devices has been exhausted.

Accordingly, when the system detects that a maximum number of client devices are connected to the access point when the new client device from a high priority data zone attempts to connect to the access point, the system can select a connected client device from a low priority zone and de-authenticate the selected client device. For example, the system may select a client device from a low priority zone (e.g., WLAN3 170 or WLAN4 180) that has the least received signal strength indicator (RSSI) value. In another example, the system may select a client device from a low priority zone (e.g., WLAN3 170 or WLAN4 180) that has a low quality-of-service (QoS) parameter. By doing so, the system can disconnect a selected number or percentage of client devices in low priority data zones from the access point to accommodate new client devices from a high priority data zone.

In some examples, new data zones can be dynamically created and the zone-based network resource allocations can be dynamically adjusted. For example, a new data zone 4 (not shown) may be created after data zone 1 120, data zone 2 130, and data zone 3 140 are created. The controller in the new zone (e.g., data zone 4) may push its VAP profile and ESSID to access point 100. Subsequently, access point 100 may start transmitting beacons including the ESSID corresponding to data zone 4. If the total number of client devices from data zone 1 to data zone 3 already exceeds the maximum number of allowed client devices per access point, the system can dynamically re-allocate the AP's resources. For example, after re-allocation of network resources, the system may be configured to allow a maximum of 40% of client devices to be connected from WLAN2 160, and a maximum of 20% of client devices to be connected from each of WLAN3 170, WLAN4 180, and the WLAN corresponding to the new data zone (e.g., data zone 4).

Note that in a multi-zone WLAN deployment, more than one ESSIDs are transmitted in beacons from the same access point over the same wireless communication channel. When the access point transmits more than one ESSIDs received from different controllers, the radio frequency planning, user-role based firewalling, and bandwidth contract may no longer work. Therefore, in order to provide the above WLAN features, when the number of client devices connected to the access point exceeds a threshold level, the system may disconnect client devices from a particular zone to avoid unnecessarily disconnecting valuable client devices from the access point.

In addition to the number or percentage of connected wireless client devices to the access point, the air time consumed by each connected client device can be managed in a similar fashion. For example, more air time may be allocated to the client devices of a particular carrier. Those client devices from a high priority data zone may be guaranteed to have a better performance compared to the client devices from other low priority data zones, because the carrier pay for the premium services.

In the multi-zone environment illustrated in FIG. 1, access point 100 services client devices from different data zones 120-140. For illustration purposes, assuming that three client devices are connected from WLAN2 160; four client devices are connected from WLAN3 170; and four client devices are connected from WLAN4 180. Also, assuming that data zone 1 120 is a high priority data zone, whereas data zone 2 130 and data zone 4 140 are low priority data zones. The system may provide air time fairness to the eleven client devices connected to access point 100 based on their corresponding data zones and the user configurable priorities associated with each data zone. Specifically, because data zone 1 120 is a high priority data zone, the three client devices in WLAN2 160 can have a larger amount of air time than the other eight client devices in WLAN3 170 and WLAN4 180. This is so regardless of the client capabilities and applicable network policies. In other words, even if the other eight client devices from WLAN3 170 and WLAN4 180 have the same client device configurations and capabilities as the three client devices from WLAN2 160, the three client devices from WLAN2 160 can still consume more air time because their carrier is a premium carrier in the example multi-zone environment. In some examples, even if the client devices from WLAN2 160 have inferior client capabilities (e.g., three IEEE 802.11n compliant client devices in WLAN2 160) than another client device from a different data zone (e.g., an IEEE 802.11ac compliant client device in WLAN3 170), the client devices from the high priority data zone may still enjoy a larger amount of air time compared to the other client device with superior client capabilities from the low priority data zone. In sum, this air time fairness mechanism supporting multi-zone deployment can aid client devices in a high priority data zone to have better access and throughput than client devices in a low priority data zone.

Figure 2:
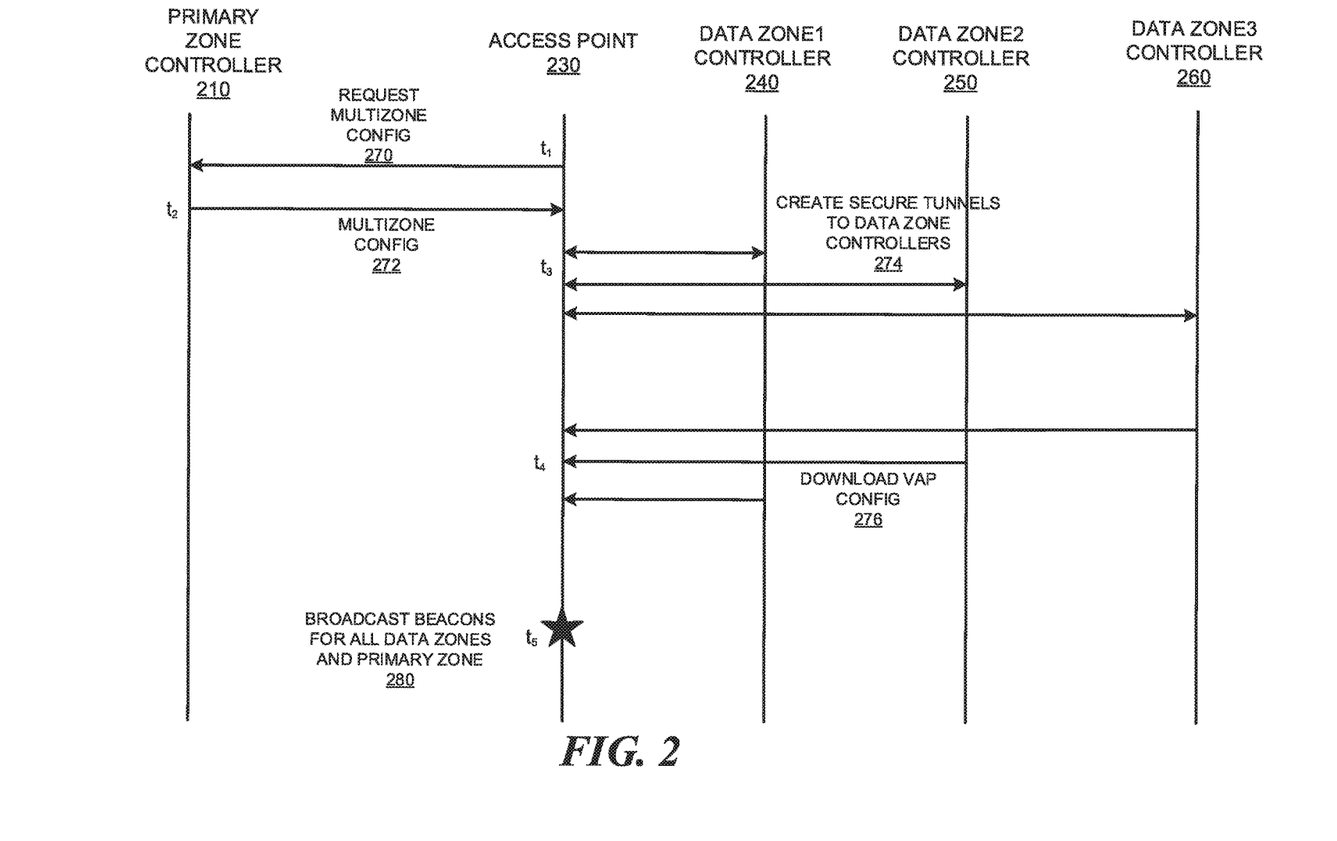
FIG. 2 is a sequence diagram of example communication exchanges between an access point and controllers in multi-zones for selectively de-authenticating a client device managed by a controller associated with multi-zones.

FIG. 2 is a sequence diagram of example communication exchanges between an access point and controllers in multi-zones for selectively de-authenticating a client device managed by a controller associated with multi-zones. FIG. 2 includes an access point 230, a primary zone controller 210, and a plurality of data zone controllers, including, e.g., data zone 1 controller 240, data zone 2 controller 250, and data zone 3 controller.

During operations, at time point $t_1$, access point 230 transmits a request for a multi-zone configuration 270 to primary zone controller 210. Upon receiving request 270, at time point $t_2$, primary zone controller 210 sends a response with multi-zone configuration 272. The multi-zone configuration 272 may include the network addresses (e.g., IP address) for multiple controllers from different data zones, including but not limited to, data zone 1 controller 240, data zone 2 controller 250, and data zone 3 controller 260.

Then, at time point $t_3$, access point 230 can create secure tunnels to data zone controllers 274, for example, Generic Routing Encapsulation (GRE) and/or Internet Protocol Security (IPsec) tunnels. In the example shown in FIG. 2, three different secure tunnels are established between access point 230 and data zone 1 controller 240, data zone 2 controller 250, and data zone 3 controller 260 respectively.

Thereafter, access point 230 may download a virtual access point (VAP) configuration from each respective data zone controller. For example, at time point $t_4$, access point 230 may receive a first VAP configuration from data zone 3 controller 260, a second VAP configuration from data zone 2 controller 250, and a third VAP configuration from data zone 3 controller 240. Once the VAP configurations are downloaded from the data zone controllers, the access point 230 may start sending beacons over the air, where each beacon may include a respective ESSID for a respective zone. The respective zone may include, but is not limited to, the primary zone (SFO_Airport), data zone 1 (AT&T), data zone 2 (Verizon), and data zone 3 (Sprint).

In these examples, VAPs may refer to logical AP instances on the same physical access point that cater to the unique requirements of various client devices in different data zones. To a client device, the VAP appears as an independent access point with its own unique SSID.

Next, at time point $t_5$, access point 230 may start broadcast beacons for all data zones and the primary zone 280. There are many approaches to implementing the VAPs. In one implementation, a single BSSID may be used and the access point may advertise all the SSIDs supported by the system on the same beacon. In other implementations, multiple ESSIDs are used with one ESSID advertised per beacon and multiple beacons are used to advertise the ESSIDs corresponding to the configured VAPs, which correspond to the multiple zones in the multi-zone environment. Client devices can then see all of the ESSIDs, including the ESSID corresponding to the primary zone. Therefore, each client device can connect to the ESSID based on its choice and preference.

In the example of SFO airport as illustrated in FIG. 1, access point 100 may first boot up and terminate on the airport controller in WLAN1 150. The airport controller in WLAN 150 can then send a multi-zone configuration to access point 100. Access point 100 can then send a "hello" message to each data zone controller specified in the multi-zone configuration. In this specific example, access point 100 may send a "hello" message to the controller in the data zone 1 (AT&T) 120, the controller in the data zone 2

(Verizon) 130, and the controller in the data zone 3 (Sprint) 140. Once the access point is allowed on the data zone controllers, the data zone controllers can push the VAP configuration on to access point 100. Table 1 below illustrate an example multi-zone access point configuration profile.

TABLE 1 ap multizone-profile "sampleConfig"

datazone 1 controller-ip 10.15.146.3 num-vaps 1 num-nodes 1 priority 200
datazone 2 controller-ip 10.16.140.5 num-vaps 2 num-nodes 2 priority 100
datazone 3 controller-ip 10.20.102.4 num-vaps 2 num-nodes 4 priority 50
primaryzone num-vaps 2 num-nodes 2 priority 100
multizone-enable The sampleConfig multi-zone configuration profile illustrated in Table 1 includes three data zones and a primary zone. Each data zone configuration includes an IP address of the controller managing the respective data zone, the VAP identifier corresponding to the respective data zone, the number of nodes corresponding to the respective data zone, a priority setting for the respective data zone. The primary zone configuration includes a total number of VAPs configured for the multiple data zones, a total number of nodes, and a priority setting for the primary zone.

Note that different data zones can share the same VAP. In sampleConfig, there are seven VAPs configured on the access point. Primary zone has two VAPs, data zone 1 has one VAP, and data zone 2 and data zone 3 each have two VAPs. Also, there is no restriction on the priority setting. The priority setting for a respective data zone may be higher than, equal to, or lower than the priority setting for the primary zone. In the sampleConfig, the priority setting for data zone 1 is higher than the primary zone; the priority setting for data zone 2 is equal to the primary zone; and, the priority setting for data zone 3 is lower than the primary zone.

Figure 3:
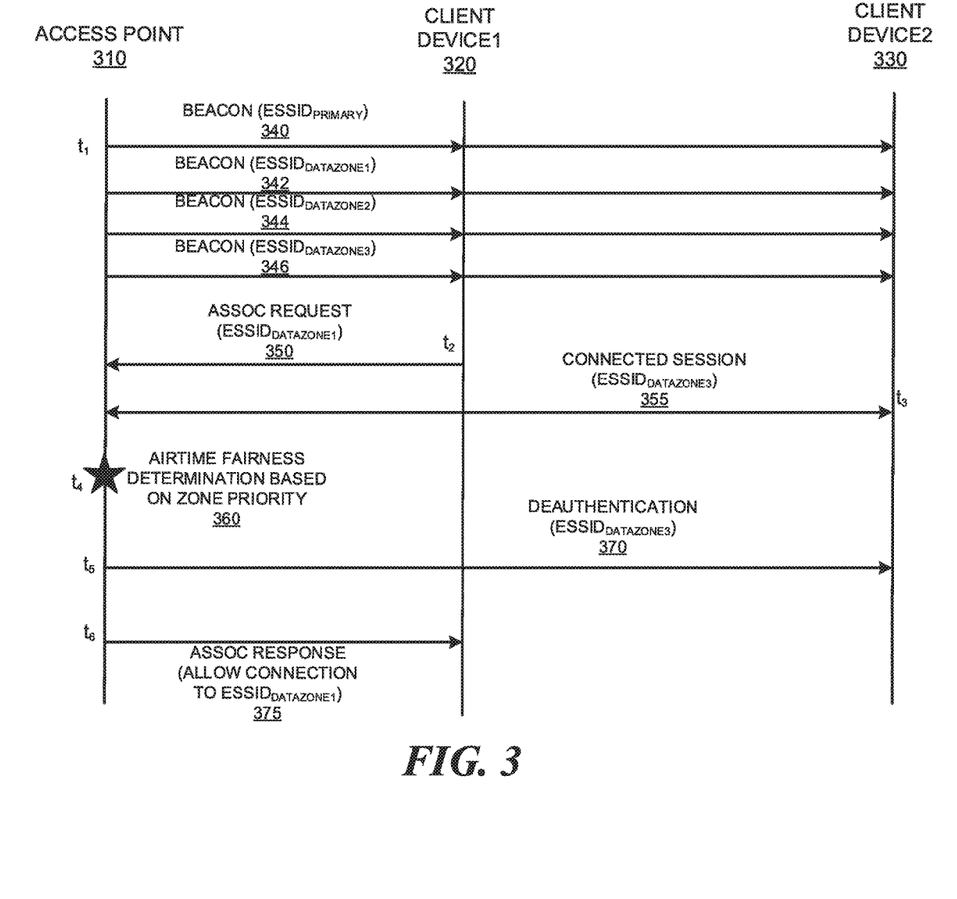
FIG. 3 is a sequence diagram of example communication exchanges between an access point and client devices in multi-zones for selectively de-authenticating a client device managed by a controller associated with multi-zones.

FIG. 3 is a sequence diagram of example communication exchanges between an access point and client devices in multi-zones for selectively de-authenticating a client device managed by a controller associated with multi-zones. FIG. 3 includes an access point 310, a client device 1 320, and a client device 2 330. At time point $t_1$, access point 310 can broadcast multiple beacons with different ESSIDs. For example, beacon 340 includes $ESSID_{PRIMARY}$ for the primary zone; beacon 342 includes $ESSID_{DATAZONE1}$ for data zone 1; beacon 344 includes $ESSID_{DATAZONE2}$ for data zone 2; and, beacon 346 includes $ESSID_{DATAZONE3}$ for data zone 3. The beacons 340-346 are received by both client device 1 320 and client device 2 330.

For illustration purposes only, assuming that Data Zone 1 (AT&T) is a high priority data zone and Data Zone 3 (Sprint) is a low priority data zone. Assuming that client device 1 320 is associated with an AT&T customer, and that client device 2 330 is associated with a Sprint customer. Thus, in this example, at time point $t_2$, client device 1 320 may send an association request to access point 310, requesting to connect to $ESSID_{DATAZONE1}$. On the other hand, assuming that client device 2 330 already has a connected session 355 with access point 310, which has an active communication exchange at time point $t_3$. Specifically, client device 2 330 may be connected to a WLAN that corresponds to $ESSID_{DATAZONE3}$.

Thereafter, at time point $t_3$, access point 310 makes an airtime fairness determination based at least on the zone priority 360. For example, access point 310 may determine that data zone 1 can have a larger threshold number (or percentage) of client devices connected to the access point than data zone 3. As another example, access point 310 may determine that client devices in data zone 1 may be allocated a larger amount (or percentage) of air time than the client devise in data zone 3.

In the SFO airport example, client devices connecting to the WLAN corresponding to the AT&T carrier may have the highest priority. That means these client devices can have the highest priority while connecting to the network at the SFO airport and can enjoy air time fairness while accessing resources of the access point.

Specifically, an example air time fairness allocation may be according to a ratio of 4:2:1:2 for Data Zone1:Data Zone2:Data Zone3:Primary Zone respectively. Therefore, if the access point's system resources are fully utilized at 100%, and a client device of an AT&T customer tries to connect to the access point. The connection request from the client device of the AT&T customer may cause de-authentication of connected client devices of a Sprint customer instead of other connected client devices of Verizon customer or client devices connected through the SFO airport WLAN. For example, if 64 is the resource limit for the number of client devices allowed to connect to the access point. The number of client devices allowed to connect to the access point from each zone may be determined as per Table 2.

TABLE 2

28 from AT&T on $ESSID_{ATT\_WIFI}$
14 from Verizon on $ESSID_{VERIZON\_WIFI}$
7 from Sprint on $ESSID_{SPRINT\_WIFI}$
14 from SFO Airport on $ESSID_{SFO\_WIFI}$ Since these implementations are dynamic, if one of the zones is not serving any client devices, the system may allow other zones to have more client devices to be connected according to the same pre-configured ratio as mentioned above. The primary zone controller (e.g., the SFO airport controller) can configure whether additional client devices from other low priority data zones are allowed to connect to the access point, if few client devices are connected from the high priority data zone, because the primary zone controller is the controller hosting the network resources (e.g., the access point's resources).

In the illustrated example, access point 310 may determine that the total number of client devices connected to data zone 3 has exceeded the threshold number of allowed client devices. Therefore, at time point $t_5$, access point 310 may transmit a de-authentication request 370 to client device 2 330 that is connected to WLAN with $ESSID_{DATAZONE3}$. In some examples, access point 310 may select client device 2 330 over other client devices in the same WLAN to de-authenticate, because client device 2 330 is detected to be idle for a long time. In other examples, access 310 may select client device 2 330 to de-authenticate, because client device 2 330 has a weakest signal strength detected by access point 310 and client device 2 330 may receive better network connection if it is connected to a different access point in the same WLAN.

Because at least one client device is de-authenticated from access point 310, access point 310 can now accommodate a new connection from a new client device, namely, client device 1 320 from data zone 1. Thus, at time point t6, access point 310 transmits an association response that allows client device 1 320 to connect to the WLAN with ESSID$_{DATAZONE1}$ 375.

Figure 4:
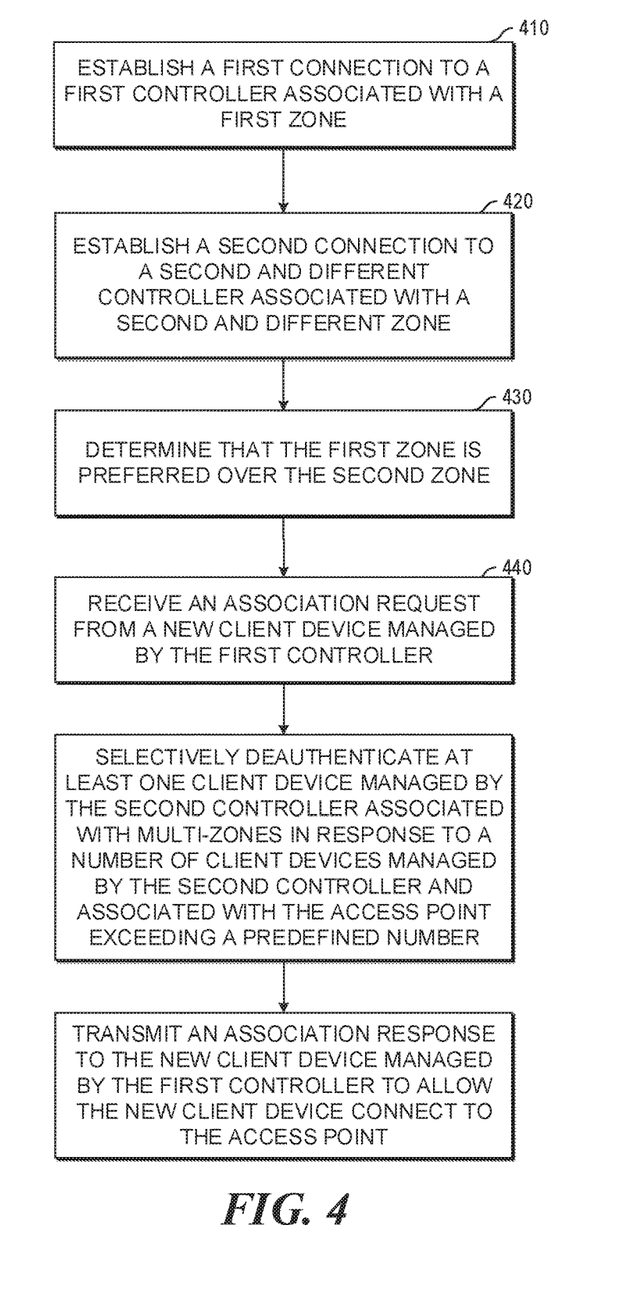
FIG. 4 is a flowchart of an example process of selectively de-authenticating a client device managed by a controller associated with multi-zones.

Processes of Selectively De-Authenticating Client Device Managed by Controller Associated with Multi-Zones FIG. 4 is a flowchart of an example method (e.g., process) of selectively de-authenticating a client device managed by a controller associated with multi-zones. During operations, a network device (e.g., an access point) can establish a first connection to a first controller associated with a first zone (operation 410). Then, the network device can establish a second connection to a second and different controller associated with a second and different zone (operation 420). Also, the network device can determine that the first zone is preferred over the second zone (operation 430). Subsequently, the network device may receive an association request from a new client device managed by the first controller (operation 440). In response to a number of client devices managed by the second controller and associated with the access point exceeding a predefined number, the network device may selectively de-authenticate at least one client device managed by the second controller associated with multi-zones (operation 450). Then, the network device can transmit an association response to the new client device managed by the first controller to allow the new client device connect to the access point (operation 460).

In some implementations, a network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information.

In some examples, the network device can further transmit a first wireless beacon subsequent to establishing the first connection to the first controller. Here, the first wireless beacon includes a first extended service set identification (ESSID). Moreover, the network device can also transmit a second wireless beacon subsequent to establishing the second connection to the second controller. Here, the second wireless beacon includes a second and different ESSID. Also note that the first wireless beacon and the second wireless beacon are transmitted on a same wireless channel medium.

In some examples, the network device may receive a predefined number corresponding to a maximum number of client devices allowed to connect to the second ESSID. In response to the number of the client devices connected to the second ESSID exceeding the predefined number, the network device may reject a new association request from a new client device that attempts to connect to the second ESSID. Subsequent to rejecting the new association request from the new client device that attempts to connect to the second ESSID, the network device can allow a new association request from a new client device that attempts to connect to the first ESSID.

Moreover, in some examples, the network device can receive a predefined percentage corresponding to a maximum percentage of client devices associated with the access point that are allowed to connect to the second ESSID. In response to the percentage of the client devices connected to the second ESSID exceeding the predefined percentage, the network device reject a new association request from a new client device that attempts to connect to the second ESSID. Subsequent to rejecting the new association request from the new client device that attempts to connect to the second ESSID, the network device may allow a new association request from a new client device that attempts to connect to the first ESSID.

In some examples, the network device may select the at least one client device based on a low received signal strength indicator (RSSI) associated with the at least one client device.

In some examples, the network device may receive a predefined amount (or percentage) of air time allocated for client devices connected to the second ESSID. Accordingly, the network device may refrain from transmitting data from the access point to the client devices connected to the second ESSID in response to air time consumed by the client devices connected to the second ESSID exceeding the predefined amount of air time. In some examples, client devices managed by the first controller may have more air time than client devices managed by the second controller according to a pre-configurable ratio. In other examples, traffic transmitted from an access point to client devices managed by the first controller has a higher priority than traffic transmitted from the access point to client devices managed by the second controller.

Network Device to Selectively De-Authenticate Client Device Managed by Controller Associated with Multi-Zones As used herein, a network device may be implemented, at least in part, by a combination of hardware and programming. For example, the hardware may comprise at least one processor (e.g., processor 510) and the programming may comprise instructions, executable by the processor(s), stored on at least one machine-readable storage medium (e.g., 520). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

Figure 5:
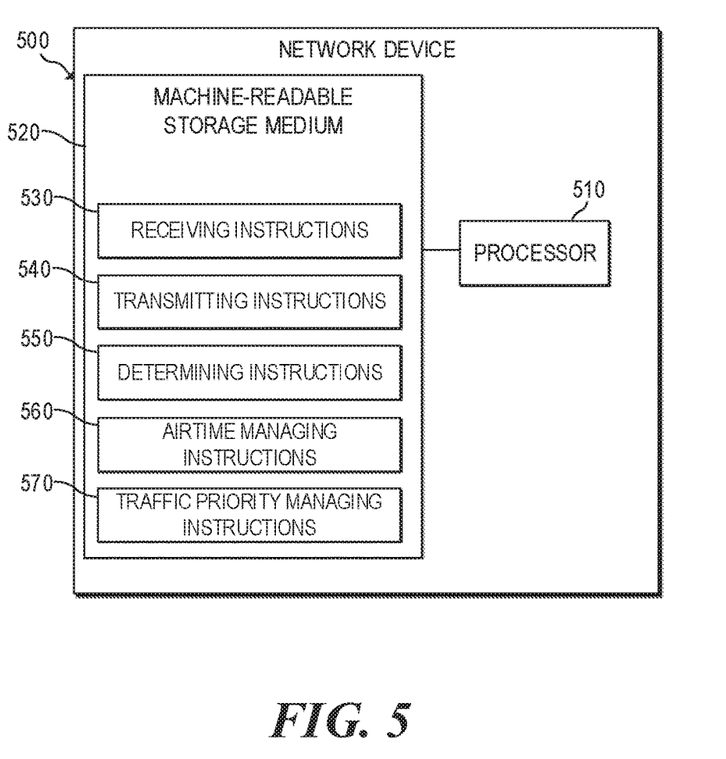
FIG. 5 is a block diagram of an example network device to selectively de-authenticate a client device managed by a controller associated with multi-zones.

The at least one processor 510 may fetch, decode, and execute instructions stored on storage medium 520 to perform the functionalities described below in relation to receiving instructions 530, transmitting instructions 540, determining instructions 550, airtime managing instructions 560, and traffic priority managing instructions 570. In other examples, the functionalities of any of the instructions of storage medium 520 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 5, storage medium 520 may be implemented by one machine-readable storage medium, or multiple machine-readable storage media.

Although network device 500 includes at least one processor 510 and machine-readable storage medium 520, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 530-570 may be executed by processor 510 to: establish a first connection to a first controller associated with a first zone; establish a second connection to a second and different controller associated with a second and different zone; determine that the first zone is preferred over the second zone; receive an association request from a new client device managed by the first controller; selectively de-authenticate at least one client device managed by the second controller associated with multi-zones in response to a number of client devices managed by the second controller and associated with the access point exceeding a predefined number; transmit an association response to the new client device managed by the first controller to allow the new client device connect to the access point; transmit a first wireless beacon subsequent to establishing the first connection to the first controller, wherein the first wireless beacon includes a first extended service set identification (ESSID); transmit a second wireless beacon subsequent to establishing the second connection to the second controller, wherein the second wireless beacon includes a second and different ESSID, wherein the first wireless beacon and the second wireless beacon are transmitted on a same wireless channel medium; etc.

Also, instructions 530-570 may be executed by processor 510 further to: receive a predefined number corresponding to a maximum number of client devices allowed to connect to the second ESSID; reject a new association request from a new client device that attempts to connect to the second ESSID in response to the number of the client devices connected to the second ESSID exceeding the predefined number; allow a new association request from a new client device that attempts to connect to the first ESSID subsequent to rejecting the new association request from the new client device that attempts to connect to the second ESSID; receive a predefined percentage corresponding to a maximum percentage of client devices associated with the access point that are allowed to connect to the second ESSID; reject a new association request from a new client device that attempts to connect to the second ESSID in response to the percentage of the client devices connected to the second ESSID exceeding the predefined percentage; allow a new association request from a new client device that attempts to connect to the first subsequent to rejecting the new association request from the new client device that attempts to connect to the second ESSID; etc.

In addition, instructions 530-570 may be executed by processor 510 further to: select the at least one client device based on a low received signal strength indicator (RSSI) associated with the at least one client device; receive a predefined amount of air time allocated for client devices connected to the second ESSID; refrain from transmitting data from the access point to the client devices connected to the second ESSID in response to air time consumed by the client devices connected to the second ESSID exceeding the predefined amount of air time; allocate more air time to client devices managed by the first controller than client devices managed by the second controller in a pre-configurable ratio; allocate a higher priority to traffic transmitted from an AP to client devices managed by the first controller than traffic transmitted from the AP to client devices managed by the second controller; etc.

We claim:

1. A method comprising:
   establishing, by an access point, a first connection to a first controller associated with a first zone;
   establishing, by the access point, a second connection to a second and different controller associated with a second and different zone;
   determining, by the access point, that the first zone is preferred over the second zone;
   receiving, by the access point, an association request from a new client device managed by the first controller;
   in response to a number of client devices managed by the second controller and associated with the access point exceeding a predefined number, selectively de-authenticating at least one client device managed by the second controller associated with multi-zones; and
   transmitting, by the access point, an association response to the new client device managed by the first controller to allow the new client device connect to the access point.

2. The method of claim 1, further comprising:
   transmitting a first wireless beacon, by the access point, subsequent to establishing the first connection to the first controller, wherein the first wireless beacon includes a first extended service set identification (ESSID); and
   transmitting a second wireless beacon, by the access point, subsequent to establishing the second connection to the second controller, wherein the second wireless beacon includes a second and different ESSID, wherein the first wireless beacon and the second wireless beacon are transmitted on a same wireless channel medium.

3. The method of claim 2, further comprising:
   receiving a predefined number corresponding to a maximum number of client devices allowed to connect to the second ESSID; and
   in response to the number of the client devices connected to the second ESSID exceeding the predefined number, rejecting a new association request from a new client device that attempts to connect to the second ESSID.

4. The method of claim 3, further comprising:
   subsequent to rejecting the new association request from the new client device that attempts to connect to the second ESSID, allowing a new association request from a new client device that attempts to connect to the first ESSID.

5. The method of claim 2, further comprising:
   receiving a predefined percentage corresponding to a maximum percentage of client devices associated with the access point that are allowed to connect to the second ESSID; and
   in response to the percentage of the client devices connected to the second ESSID exceeding the predefined percentage, rejecting a new association request from a new client device that attempts to connect to the second ESSID.

6. The method of claim 5, further comprising:
   subsequent to rejecting the new association request from the new client device that attempts to connect to the second ESSID, allowing a new association request from a new client device that attempts to connect to the first ESSID.

7. The method of claim 1, further comprising:
selecting the at least one client device based on a low received signal strength indicator (RSSI) associated with the at least one client device.

8. The method of claim 2, further comprising:
receiving a predefined amount of air time allocated for client devices connected to the second ESSID; and
refraining from transmitting data from the access point to the client devices connected to the second ESSID in response to air time consumed by the client devices connected to the second ESSID exceeding the predefined amount of air time.

9. The method of claim 1, wherein client devices managed by the first controller have more air time than client devices managed by the second controller in a pre-configurable ratio.

10. The method of claim 1, wherein traffic transmitted from an AP to client devices managed by the first controller has a higher priority than traffic transmitted from the AP to client devices managed by the second controller.

11. An access point, comprising at least:
a memory;
a processor executing instructions from the memory to:
establish a first connection to a first controller associated with a first zone and a second connection to a second and different controller associated with a second and different zone;
determine that the first zone is preferred over the second zone;
receive an association request from a new client device to be managed by the first controller;
in response to a number of client devices managed by the second controller and associated with the access point exceeding a predefined number, selectively de-authenticate at least one client device managed by the second controller associated with multi-zones; and
transmit an association response to allow the new client device connect to the access point, wherein the new client device is managed by the first controller associated with the first zone that is preferred over the second zone.

12. The access point of claim 11, wherein the processor further executes instructions from the memory to:
transmit a first wireless beacon, by the access point, subsequent to establishing the first connection to the first controller, wherein the first wireless beacon includes a first extended service set identification (ESSID); and
transmit a second wireless beacon, by the access point, subsequent to establishing the second connection to the second controller, wherein the second wireless beacon includes a second and different ESSID, wherein the first wireless beacon and the second wireless beacon are transmitted on a same wireless channel medium.

13. The access point of claim 12, wherein the processor further executes instructions from the memory to:
receive a predefined value corresponding to a maximum number of client devices allowed to connect to the second ESSID; and
in response to the number of the client devices connected to the second ESSID exceeding the predefined value, reject a new association request from a new client device that attempts to connect to the second ESSID.

14. The access point of claim 13, wherein the processor further executes instructions from the memory to allow a new association request from a new client device that attempts to connect to the first ESSID subsequent to rejecting the new association request from the new client device that attempts to connect to the second ESSID.

15. The access point of claim 13, wherein the predefined value comprises a predefined number corresponding to a maximum number of client devices allowed to connect to the second ESSID or a predefined percentage corresponding to a maximum percentage of client devices associated with the access point that are allowed to connect to the second ESSID.

16. The access point of claim 11, wherein the processor further executes instructions from the memory to select the at least one client device based on a low received signal strength indicator (RSSI) associated with the at least one client device.

17. The access point of claim 12, wherein the processor further executes instructions from the memory to:
receive a predefined amount of air time allocated for client devices connected to the second ESSID; and
refrain from transmitting data from the access point to the client devices connected to the second ESSID in response to air time consumed by the client devices connected to the second ESSID exceeding the predefined amount of air time.

18. A non-transitory machine-readable storage medium encoded with instructions executable by at least one processor of an access point, the machine-readable storage medium comprising instructions to:
transmit a first wireless beacon subsequent to establishing a first connection to a first controller associated with a first zone, wherein the first wireless beacon includes a first extended service set identification (ESSID);
transmit a second wireless beacon subsequent to establishing a second connection to a second and different controller associated with a second and different zone, wherein the second wireless beacon includes a second and different ESSID, wherein the first wireless beacon and the second wireless beacon are transmitted on a same wireless channel medium;
determine that the first zone is preferred over the second zone;
receive an association request from a new client device to be managed by the first controller;
in response to a number of client devices managed by the second controller and associated with the access point exceeding a predefined number, selectively de-authenticate at least one client device managed by the second controller associated with multi-zones; and
transmit an association response to allow the new client device connect to the access point, wherein the new client device is managed by the first controller associated with the first zone that is preferred over the second zone.

19. The non-transitory machine-readable storage medium of claim 18, wherein the machine-readable storage medium further comprises instructions to:
receive a predefined value corresponding to a maximum number of client devices allowed to connect to the second ESSID;
in response to the number of the client devices connected to the second ESSID exceeding the predefined value, reject a new association request from a new client device that attempts to connect to the second ESSID; and allow a new association request from a new client device that attempts to connect to the first ESSID subsequent to rejecting the new association request from the new client device that attempts to connect to the second ESSID.

20. The non-transitory machine-readable storage medium of claim 18, wherein the machine-readable storage medium further comprises instructions to:
receive a predefined amount of air time allocated for client devices connected to the second ESSID; and
refrain from transmitting data from the access point to the client devices connected to the second ESSID in response to air time consumed by the client devices connected to the second ESSID exceeding the predefined amount of air time.

* * * * *